Jan. 31, 1928.
J. DOLINAR
1,657,461
BATTERY MOUNTING
Filed Dec. 28, 1925
2 Sheets-Sheet 1
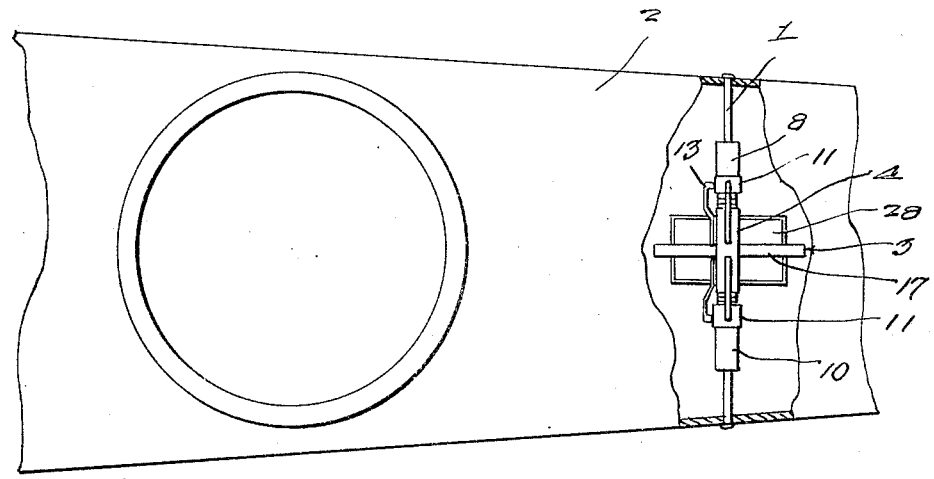
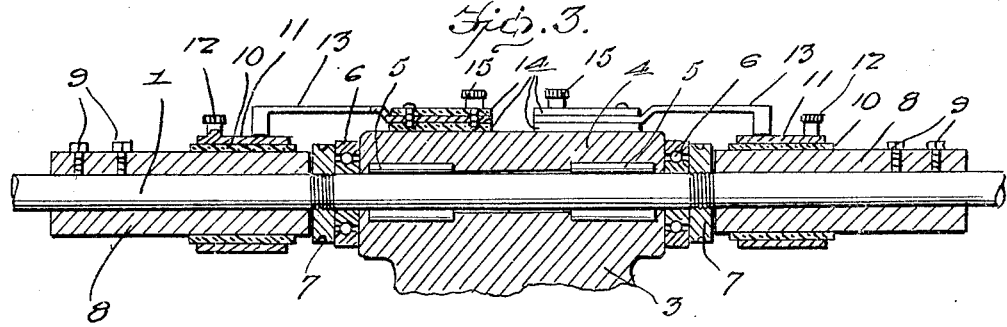
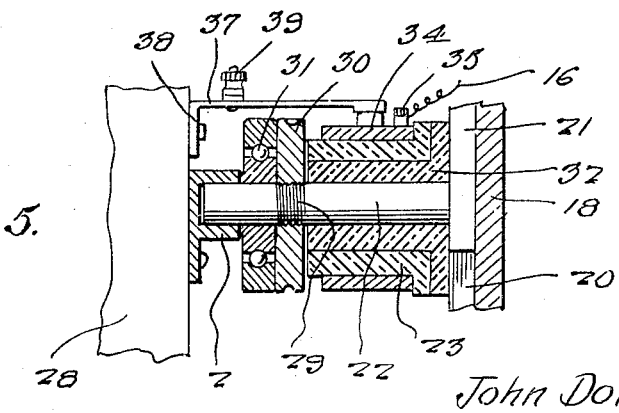
Inventor
John Dolinar
By Clarence A. O'Brien
Attorney

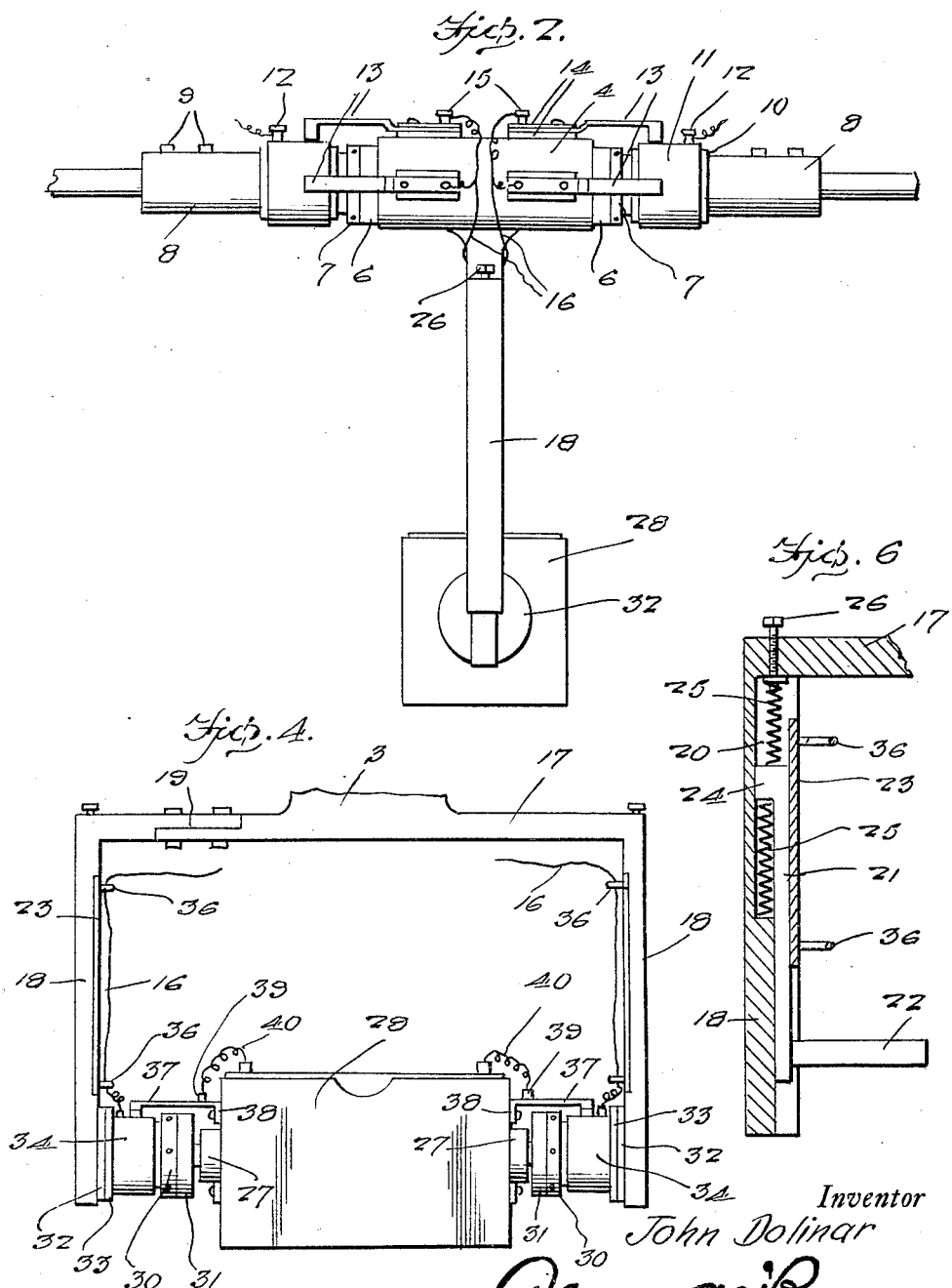

Patented Jan. 31, 1928.

1,657,461

UNITED STATES PATENT OFFICE.

JOHN DOLINAR, OF SABRATON, WEST VIRGINIA.

BATTERY MOUNTING.

Application filed December 28, 1925. Serial No. 77,990.

This invention relates to improvements in mounting devices for secondary batteries, and more particularly to a device for mounting a storage battery in an aeroplane in such a manner that it will be maintained in an upright position through the action of gravity without respect to the position of the plane.

An object of the invention resides in providing a universal mounting device for a secondary battery in order that the battery may be mounted in an aeroplane and maintained in an upright position so as to prevent the electrolyte from leaking out and the operation of the battery interfered with.

It is a further object of this invention to provide a support for a secondary battery adapted to provide a universal mounting therefor in order that it may maintain an upright position under the action of gravity without respect to the position of the structure to which the mounting is attached, and in addition to provide conductor connections between the several parts of the mounting in order that circuit connections can be made with the battery and in which the certain connections have relatively rotatable parts to freely admit of the universal movement of the mounting for the battery.

This invention comprehends numerous other objects and advantages residing in the details of construction and assembly of the parts, which are more particularly pointed out in the following detailed description and in the claims directed to a preferred form of the invention, it being understood however, that various changes in the size, shape and relation of the parts may be made without departing from the spirit and scope of the invention as hereinafter set forth.

In the drawings forming part of this application,

Figure 1 is a plan view of a portion of an aeroplane, having portions broken away and to which this invention has been applied.

Fig. 2 is a side elevation of the improved mounting shown on a substantially enlarged scale.

Fig. 3 is a horizontal sectional view taken through the main supporting shaft and associated parts of the mounting.

Fig. 4 is an enlarged detail view in side elevation and in a position at relative right angles to the showing of Fig. 2 of the battery box and the manner in which it is mounted in the rotatable bracket member.

Fig. 5 is a detail sectional view on an enlarged scale of the mounting for the battery box in the bracket member.

Fig. 6 is another detail sectional view of one leg of the bracket member showing the structure for absorbing vibrations and preventing transmission thereof to the battery.

1 indicates the main supporting shaft which is mounted in the sides of the body of the aeroplane 2, in any suitable manner such as indicated in Fig. 1 of the drawing, and which forms the main support for the battery in the aeroplane. A rotatable supporting or carrying bracket is indicated at 3 which is provided with a head 4 having a bore therein receiving the shaft 1, and provided with roller bearings 5 having free bearing engagement upon said shaft. This construction provides a free rotatable mounting for the carrying bracket 3 on the shaft 1, while thrust bearings 6 prevent endwise movement of the supporting bracket on the shaft.

Suitable adjusting members 7 are threadedly mounted on the shaft 1 as illustrated clearly in Fig. 3 for adjusting the present bearing 6 in order to take up wear and lost motion and thereby prevent relative movement of the head 4 on shaft 1 in an axial direction.

On opposite sides of the head 4 of the supporting bracket and beyond the adjusting members 7 for the thrust bearing, collars 8 are mounted on the shaft 1 and held in position by suitable set screws 9. Insulating sleeves 10 are mounted on these collars and receive contact bands 11 which are provided with suitable terminal posts 12 to receive cable terminals from suitable electrical apparatus mounted in the aeroplane. A pair of resilient thrust members 13 have one end thereof mounted between insulating plates 14 and secured to the head 4 of the supporting bracket member.

The opposite ends of these resilient brush members 13 extend in opposite directions from the head 4 and have bearing engagement on the contact sleeves 11 so that an electric circuit may be established with the apparatus mounted on the supporting bracket 3 without interfering with the rotatable mounting of the bracket on the shaft 1, as the brushes will move with the head 4 in rotation about the shaft and have constant bearing engagement on the sleeves 11. The resilient brush members 13 are provided with suitable terminal posts 15 for receiving wire connections 16 from other terminals on the supporting bracket 3 which will be described.

As shown in Fig. 2, two sets of brush members 13 may be mounted on the head 4 of the supporting bracket and connected to the wires 16 in order to insure constant and efficient circuit connections with the wires 16 and the sleeves 11.

The supporting member 3 is formed with a cross arm 17 which is provided with a pair of laterally extending parallel legs 18 at the ends thereof, one of said legs being detachably connected with the cross arm 17 through the overlapped joint 19 shown clearly in Fig. 4, the purpose of which will presently appear. Each of the legs 18 is provided with guideways 20 for slidably receiving the stub shaft bracket 21 carrying the stub shaft 22 at one end thereof and retained in said guideways by the retainer plate 23. One end of each of the stub shaft brackets 21 is formed with a laterally projecting head 24 on the opposite sides of which engage the coiled springs 25 which are received within the enlarged portions of the guideway 20.

The adjusting screws 26 are manually operable to vary the compression of the spring 25 and thereby control the movement of the stub shaft supporting brackets 21 in the legs 18. These stub shafts project inwardly in substantial axial relation and in the assembled relation of the parts as shown in Fig. 4, the inner ends of these stub shafts are rotatably received by the socket members 27 mounted on the ends of the battery box 28 so that the battery contained within said box will be rotatably supported on the stub shaft 22.

These stub shafts 22 are threaded as indicated at 29 and receive the adjusting collars 30 for the thrust bearings 31 which are adapted for adjustment to control the position of the battery box on the stub shaft 22 and prevent endwise movement thereof relative to said stub shaft. Fig. 5 clearly shows the structure of the socket members 27 and the adjusting members 30 and the manner in which the parts are co-related so that the adjustment of the members 30 will control the position of the battery box on the stub shaft and prevent the endwise movement thereof as well as compensate for wear between the parts.

Metallic collars 32 are pressed onto each stub shaft 22 and have the annular flanges at one end thereof bearing against the carrying brackets 21 as clearly shown in Fig. 5. These collars receive insulating sleeves 33 provided with annular flanges on the end adjacent the brackets 21, and against which are positioned the ends of the contact bands 34 which are positioned on said insulating sleeves and are provided with terminal posts 35 for receiving the ends of the wires 16 from the terminal posts 15. These wires 16 are guided by suitable eyes 36 mounted on the retaining plates 23 as clearly shown in Fig. 4.

Resilient brush members 37 have one end extended laterally and secured to the edge of the battery box 28 as shown at 38 in Fig. 5, while the opposite end projects for resilient engagement with the periphery of the contact band 34 to make electric circuit connection therewith. The brush members 37 are provided with terminal posts 39 for receiving the wire connections 40 from the terminals of the battery in the battery box 28.

The battery box 28, through the circuit members 37 is rotatably supported on the stub shaft 22 against endwise movement with respect to said stub shaft through the adjustment of the collars 30. The circuit connections from the terminals of the battery through the wires 40 to the two brushes 37 provide for the transmission of energy from the brushes to the sleeves 33 and the wires 16 without in any way interfering with the rotation of the battery relative to the supporting bracket member 3. The rotatable mounting of the bracket member 3 by the head 4 on the shaft 1, which mounting is at right angles with relation to the rotatable mounting of the battery box on the stub shaft, permits the movement of the battery box shaft 1 while endwise movement is prevented through the adjustment of the thrust bearings 6.

Circuit connections are made through the wires 16, the brush members 13, and the sleeves 11 to wire connections with any suitable apparatus mounted in the aeroplane. This provides a universal mounting for the battery in the box 28 relative to the supporting body 22 of the aeroplane or other vehicle so that the battery box may be maintained by the action of gravity in a vertical plane at all times without respect to the position of the body 2.

The advantage of this invention for supporting a storage battery in an aeroplane is readily apparent in view of the disadvantage in directly mounting the battery in the body 2 which is normally movable through an arc of 360° which in numerous positions will permit the escape of the electrolyte in the battery so that it is usually impracticable to use a storage battery in an aeroplane. This invention will permit the free movement of the aeroplane, the battery being maintained constantly in a vertical plane thereby preventing the inverting of said battery with the consequent damage to the battery in the aeroplane and yet the circuit connections will be constantly maintained with the apparatus in the aeroplane for which a supply of current is desired through the relatively rotatable brush and sleeve connection for each side of the circuit to the battery.

In addition, the resilient mounting of the stub shaft carrying brackets 21 will substantially eliminate the transmission of vibrations and the shocks applied to the aeroplane body to the battery. It will prevent the battery from jumping or throwing the electrolytes out of the cells through the jarring and bumping caused during landing and take-off of the aeroplane.

The present invention therefore provides an efficient mounting for a secondary battery in an aeroplane or the like to permit the free universal movement of the supporting elements for the battery about the battery and allow it to remain under the action of gravity in a normally vertical plane.

Having thus described my invention, what I claim as new is:—

1. A universal mounting for secondary batteries, comprising a shaft adapted for attachment to a support, a supporting bracket rotatably mounted on said shaft and having a pair of parallel legs thereon lying in a plane substantially at right angles to said shaft, rotatable bearing members mounted on the ends of said legs for receiving a battery and rotatably supporting the same in said bracket, and relatively rotatable circuit making connections on the bracket and shaft permitting free rotation of the bracket on the shaft and maintaining circuit connection with said battery and circuits on said support.

2. A universal battery mounting, comprising a shaft adapted for attachment to a suitable support, a supporting bracket rotatably mounted on said shaft, means on the shaft for preventing endwise movement of the bracket member relative thereto, relatively rotatable circuit connections mounted on the shaft and the bracket, rotatable bearing members mounted on the bracket for receiving and rotatably mounting a battery thereon, relatively rotatable circuit connectors carried by said bearing members, and cable connections between the terminals of the battery the relatively rotatable circuit connectors of the bearing members, and the circuit connectors carried by the bracket and the shaft to provide a circuit with said support and permit the free universal movement of the battery relative to said support.

3. A battery mounting, comprising a stationary shaft mounted on a support, a supporting bracket rotatably mounted on said shaft, a battery support rotatably and slidably mounted in said supporting bracket, and means for limiting and cushioning the sliding movement of said battery support in the bracket normally adapted to retain said battery support in a predetermined relation in said bracket.

4. A battery mounting, comprising a stationary shaft adapted to be secured to a support, a supporting bracket having a hub portion rotatably mounted on said shaft, a projection on the hub portion of said bracket terminating in a pair of spaced parallel arms, a stub shaft bracket slidably mounted in each arm and having a stub shaft projecting laterally therefrom, means for limiting and cushioning the movement of said stub-shaft brackets in said arms normally adapted to retain said brackets in a predetermined position, and battery carrying means rotatable on said stub shafts.

In testimony whereof I affix my signature.

JOHN DOLINAR.